Patented Oct. 17, 1939

2,176,851

UNITED STATES PATENT OFFICE 2,176,851

ADSORBENT AND DRYING AGENT AND PROCESS OF PRODUCING IT

Pearl H. Brewer and Henry R. Kraybill, West Lafayette, Ind., assignors to Purdue Research Foundation, West Lafayette, Ind., a corporation of Indiana No Drawing. Application January 21, 1937, Serial No. 121,573

7 Claims. (Cl. 52—2)

Our invention relates to an adsorbent and drying agent, and the process of producing it.

That adsorbing and drying agent is a solid silicic-acid foam.

Such an adsorbing agent is desirable for removing various kinds of substances from liquids containing them; as, for instance, in removing phosphatides, mucilages, sterols, pigments, and associated substances from vegetable oils containing them.

Such a drying agent is desirable in many places where it is desired to remove moisture from a gas, as for instance in maintaining dry air in a closed compartment.

According to our invention, we produce a solid silicic-acid foam, which has both adsorbing and drying properties. The adsorbing properties of our material are best when it is not too dry and so when it does not have its highest efficiency as a drying agent; and vice versa.

In carrying out our invention, we treat a water solution of sodium silicate (water glass) with carbon dioxide. A reaction occurs, apparently to produce silicic acid and sodium carbonate and/or bicarbonate; and the whole mass sets to form a rigid gel.

We break up this rigid gel, desirably into fairly small pieces, place the pieces in water, and add hydrochloric acid in slight excess over the amount necessary to decompose the carbonate. The reaction of the hydrochloric acid and the carbonate sets free carbon dioxide, which expands the mass into a solid silicic-acid foam.

We wash this solid silicic-acid foam thoroughly with water; then dry it to any extent desired; and then desirably grind it or crush it to the desired size, even to a powder if desired. The extent of the drying may vary, according to whether the material is to be used primarily as a drying agent or as an adsorbing agent.

If our solid silicic-acid foam is to be used primarily as a drying agent, although it still has some adsorbent properties, it is dried rather drastically to drive off substantially all water, as by drying at a temperature above the boiling point of water, such as 105° C.

On the other hand, if it is to be used primarily as an adsorbent agent rather than as a drying agent, the drying is done at a temperature substantially below the boiling point of water, say room temperature or slightly above it; which allows a considerable amount of water to be retained.

The completely dried material, for the drying agent, can be used for absorbing water from air or other gas, as by being placed in a compartment containing such air or other gas which it is desired to dry or to keep dry. In this way it is used substantially as calcium chloride is used for a similar purpose.

Our solid silicic-acid foam, desirably in the form in which it is not dried to the state where all water is driven off, may be used effectively as an adsorbing agent, to remove various materials from liquids. Our solid foam is excellent for many types of adsorptions. A most important one is the adsorption of certain phosphatides, mucilages, sterols, and pigments from vegetable oils. A most convenient way for using it for this purpose is to use it as a medium through which the oil to be purified is passed as through a filter.

Our solid silicic-acid foam is light in weight, white in color, porous in texture, and fairly friable, and has an appearance not unlike pumice save that it is white.

The proportions which we may use in preparing our solid silicic-acid foam may vary quite considerably. An example is as follows:

Example

One kilogram of water glass, say of 40° Baumé, is diluted with about 250 grams of water. Carbon dioxide gas is passed into the diluted water glass until the whole mass, which by reason of the reaction apparently consists largely of silicic acid and sodium carbonate and/or bicarbonate in water, sets as a rigid or substantially rigid gel. This rigid gel is broken up, desirably, and placed in enough water to cover it.

Then there is added about 250 to 300 cc. of 35% hydrochloric acid; which reacts with the carbonate to set carbon dioxide free. The carbon dioxide thus set free through the gel causes it to expand into a solid foam.

When this reaction is complete, we wash the resultant solid silicic-acid foam thoroughly with water, to remove in large measure the sodium chloride that is formed and the residual hydrochloric acid; and then dry it, and desirably grind it up as has already been stated. It is now ready for use.

We claim as our invention:

1. The process of making an acid-reacting adsorbent agent, which consists in passing carbon dioxide into a water solution of sodium silicate sufficiently concentrated to produce a gel containing a sodium carbonate, treating the gel so formed with a slight excess of acid which reacts with a carbonate to liberate carbon dioxide and thereby to cause the gel to expand into a solid foam, washing the solid foam with water, and drying the solid foam.

2. The process of making an acid-reacting adsorbent agent, which consists in passing carbon dioxide into a water solution of sodium silicate sufficiently concentrated to produce a gel containing a sodium carbonate, treating the gel so formed with a slight excess of hydrochloric acid to liberate carbon dioxide and thereby to cause the gel to expand into a solid foam, washing the solid foam with water, and drying the solid foam.

3. The process of making an acid-reacting adsorbent agent, which consists in passing carbon dioxide into a water solution of sodium silicate sufficiently concentrated to produce a gel containing a sodium carbonate, treating the gel so formed with a slight excess of an acid which reacts with a carbonate to liberate carbon dioxide and thereby to cause the gel to expand into a solid foam, washing the solid foam with water, and drying the solid foam drastically to remove substantially all water.

4. The process of making an acid-reacting adsorbent agent, which consists in passing carbon dioxide into a water solution of sodium silicate sufficiently concentrated to produce a gel containing a sodium carbonate, treating the gel so formed with a slight excess of hydrochloric acid to liberate carbon dioxide and thereby to cause the gel to expand into a solid foam, washing the solid foam with water, and drying the solid foam drastically to remove substantially all water.

5. An adsorbent material consisting of a porous, friable, light-weight, solid, acid-reacting, silicic-acid foam, produced by the process of claim 1, which in appearance resembles pumice but is substantially white in color.

6. The process of making an acid-reacting adsorbent agent, which consists in passing carbon dioxide into a water solution of sodium silicate sufficiently concentrated to produce a gel containing a sodium carbonate, treating the gel so formed with a slight excess of an acid which reacts with a carbonate to liberate carbon dioxide and thereby to cause the gel to expand into a solid foam, washing the solid foam with water, and drying the solid foam gently to remove only part of the water.

7. The process of making an acid-reacting adsorbent agent, which consists in passing carbon dioxide into a water solution of sodium silicate sufficiently concentrated to produce a gel containing a sodium carbonate, treating the gel so formed with a slight excess of hydrochloric acid to liberate carbon dioxide and thereby to cause the gel to expand into a solid foam, washing the solid foam with water, and drying the solid foam gently to remove only part of the water.

PEARL H. BREWER.
HENRY R. KRAYBILL.